June 3, 1952 A. RASPET 2,599,517
FILM SPEED CONTROL FOR AERIAL CAMERAS
Filed Sept. 20, 1946 4 Sheets-Sheet 2

INVENTOR.
AUGUST RASPET
BY Maurice Landers
Atty.

June 3, 1952  A. RASPET  2,599,517
FILM SPEED CONTROL FOR AERIAL CAMERAS
Filed Sept. 20, 1946  4 Sheets-Sheet 3

INVENTOR.

BY  AUGUST RASPET

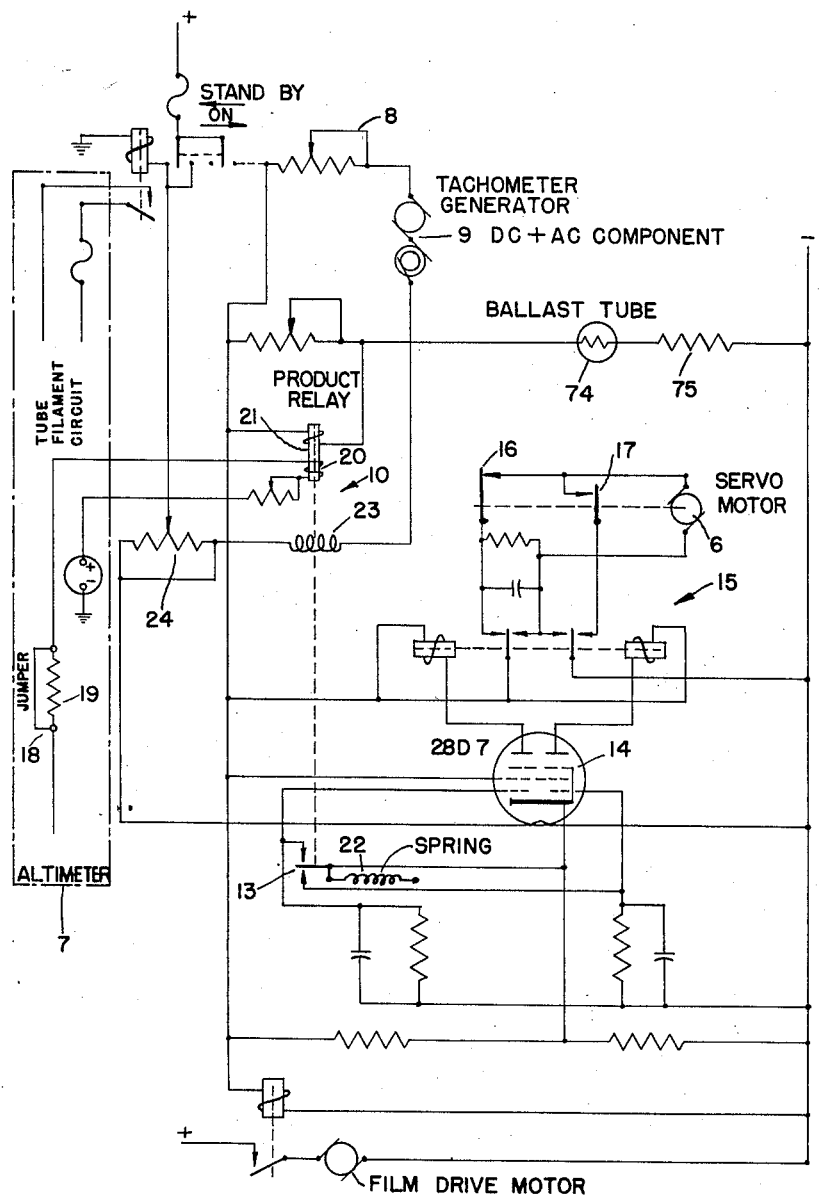
FIG. II

Patented June 3, 1952

2,599,517

UNITED STATES PATENT OFFICE 2,599,517

FILM SPEED CONTROL FOR AERIAL CAMERAS

August Raspet, Locust Valley, N. Y., assignor to Specialties, Inc.

Application September 20, 1946, Serial No. 698,171

2 Claims. (Cl. 95—12.5)

The present invention has for an object to provide an improved film driving mechanism for an aerial camera of the type wherein the film is moved during exposure as the aircraft in which the camera is mounted flies over the objective or target.

In the use of a slit camera for aerial photography, it is necessary in order to obtain a clear image that the speed of the film shall be equal to the speed of movement of the image on the film in the focal plane. To this end, the speed of the film must be changed as either the ground speed of the aircraft or the altitude above the objective varies.

This invention provides a film driving mechanism by means of which the speed of the film can be maintained such as to satisfy the formula $$v = V \times \frac{F}{a}$$

in which $v$ is the speed of the film in the camera, $V$ is the ground speed of the aircraft carrying the camera, $F$ is the focal length of the camera lens and $a$ is the altitude of the aircraft.

It is sufficiently convenient for the pilot to set the mechanism for the ground speed manually without attempting to provide devices for automatically introducing the ground speed, or what is approximately the same thing, the air speed of the aircraft. Provision is made for automatically varying the speed of the film as the altitude varies during flight either because of ascent or descent of the aircraft or because the ground to be photographed varies in elevation. In the arrangement shown, the adjustment for variation of altitude is made under control of a radio altimeter.

The nature and objects of the invention will be better understood from a description of a particular illustrative embodiment thereof for the purposes of which description reference should be had to the accompanying drawings forming a part hereof and in which:

Fig. 11 is an electrical diagram.

The control mechanism shown for the purposes of illustrating the principles of the invention is designed for application to a camera to control the speed of the film and the width of the exposure slit.

Figure 1:
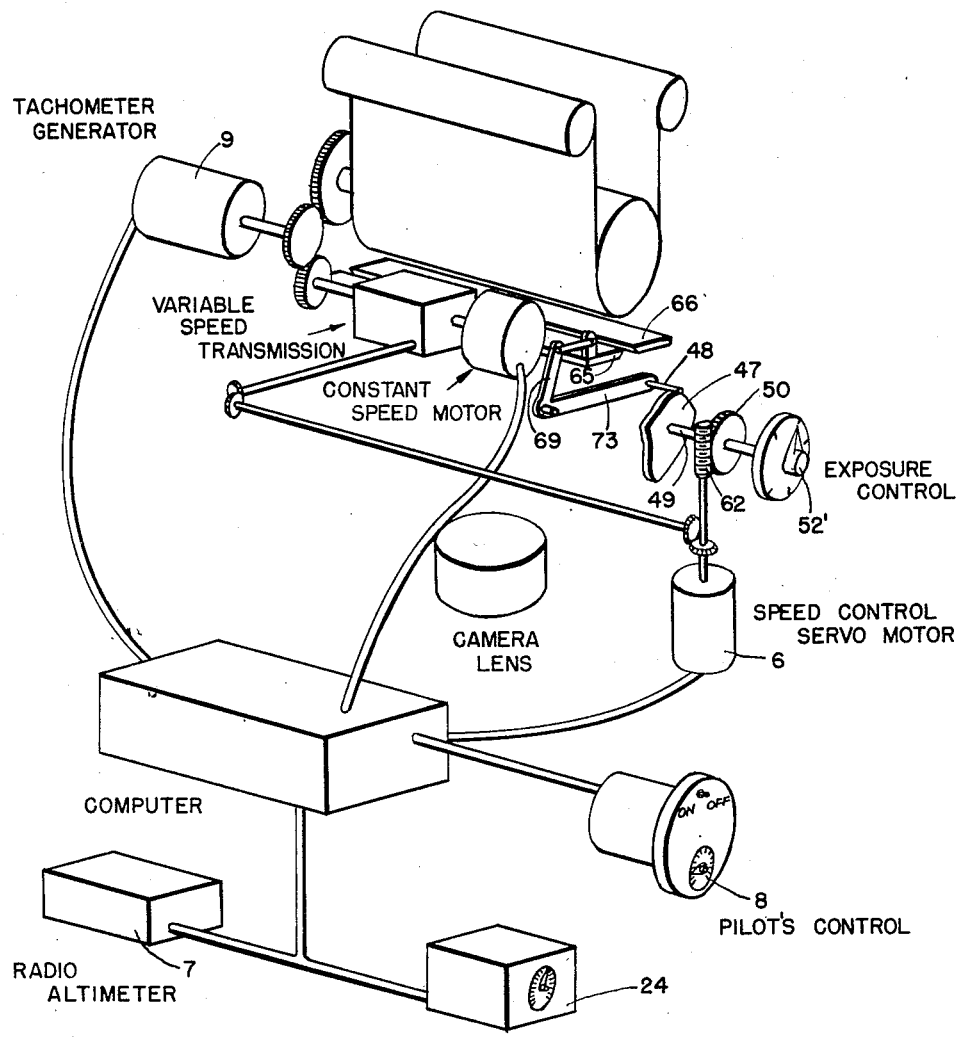
Figure 1 is a schematic perspective view of a selected embodiment of the invention as applied to a slit camera.

The standard film speed control mechanism 5 of the camera is maintained constantly in proper adjustment by servomotor 6, Fig. 1, which in turn is controlled by an electrical circuit responsive automatically to variations in altitude as indicated by the altimeter 7 and adjustable manually for the speed of the aircraft by means of a ground speed resistance 8. The speed of the film in the camera is introduced into the electrical control circuit by a tachometer generator 9, Fig. 2, driven from the film speed driving mechanism of the camera.

The servomotor 6 is controlled by a product relay 10 of the computer having input currents from altimeter 7 and tachometer generator 9. One input factor current, as shown, the current generated by the tachometer generator, is modified by resistance 8 adjusted according to the ground speed of the aircraft, thus introducing the ground speed factor into the film control. When the values of the ground speed of the aircraft, the altitude and the speed of the film are such that the formula $$v = \frac{VF}{a}$$

is satisfied, the circuit is in equilibrium but when the speed of the film increases or decreases or when the altitude decreases or increases, the relay will operate to cause a decrease or increase of the film speed respectively. Obviously, also, a change of setting of the ground speed resistance 8 by the pilot would change the point of equilibrium of the control circuit with a corresponding change of speed of the film.

The arrangement for accomplishing control includes a switch 13 operating as a part of the product relay and a vacuum tube 14 serving as an amplifier to energize the reversing relay 15 for the servomotor. Limit switches 16 and 17 prevent overrunning of the servomotor. Tube 14 is shown as a 28D7 double beam power amplifier.

In the formula, VF may be treated as a constant which changes with each resetting of the ground speed unit 8. The formula is satisfied if *av* is equal to that constant. In the circuit shown, the product relay 10 is energized by currents which are proportional respectively to the altitude and the film speed. The current from the altimeter may be introduced directly into the field coil and a current corresponding in value to the voltage generated by the tachometer generator may be introduced into the armature coil. A jumper 18 shorts a resistance 19 of the altimeter to compensate for the added resistance in the relay circuit.

The current actually delivered by the particular altimeter used in the circuit illustrated is equal to the sum of a constant plus a current nearly proportional to the altitude. This total current from the altimeter is introduced into the relay in a field winding 20 and a second current equal to the constant component of the altimeter current but of opposite sign is introduced in a second field winding 21 whereby the resultant field effect is proportional to the altitude. Hair spring 22 tends to hold the armature coil 23 of the relay in a normal position. The current developed by the tachometer generator is introduced into the armature coil 23. This generator is designed to provide a current having a relatively small A. C. component of low frequency to make the relay more sensitive. The circuit is arranged to apply to the armature coil also a small voltage through an adjustable resistance 24 to oppose the voltage provided by the tachometer in order to remove a constant error in the computed speed of the camera film.

The force due to the field coil current and the armature coil current, representing the product *av*, is balanced by the force of the hair spring 22 representing the constant product VF of the formula. The force applied by the hair spring is adjusted by manual rotation of the dial 25, Fig. 10.

The level of the opposing voltage applied to the armature coil which will provide the desired balance of the formula for various ground speeds is obtained by means of the ground speed resistance 8 which forms part of the electrical circuit. With increase of ground speed, more resistance is introduced into the circuit. It is a feature of the invention that simple provision is made for adjustment of the relay in accordance with the focal length of the camera lens and the angle of inclination of the optical axis of the camera to the horizontal plane.

It is sometimes desirable to photograph a strip of ground lying to one side of the line of flight of the aircraft, in which case the optical axis of the camera will be inclined and the altitude *h* no longer accurately represents the distance from the camera to the objective. For the purposes of such operation the formula above may be expanded to include the angle of inclination of the optical axis thus $$v = \frac{VF \sin \theta}{h}$$

wherein the new factor sin *θ* is the angle between the optical axis of the camera and the horizontal.

When operating the camera in such manner the adjustment of the hair spring 23 by the dial 25 will be slightly different as indicated by the formula. Lenses of different focal length may also be substituted on occasion. In order to facilitate such adjustment the dial and the reference plate adjacent thereto can be provided with sets of suitable graduations.

Figure 2:
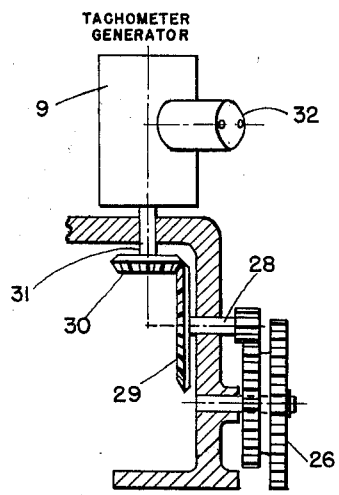
Fig. 2 is a side view partly in cross-section of the tachometer generator and gearing associated therewith.

The tachometer generator unit as shown in Fig. 2 is arranged to be installed on the camera in such position that it may be driven from one of the gears of the film driving mechanism. As shown, the unit comprises a casting with a foot plate for attachment to the gear plate of the camera. A double gear 26 is positioned to be driven by a film drive gear and it in turn drives through a horizontal shaft 28 and beveled gearing 29 and 30, the vertical shaft 31 to which the tachometer generator 9 is secured.

A suitable electrical connector socket 32 is provided for attachment of an electrical conductor cable. The voltage generator is proportional to the speed of the film within the operating limits.

Figure 3:
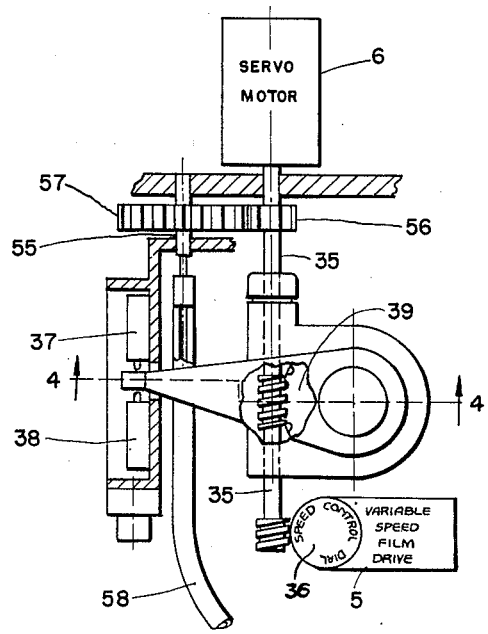
Fig. 3 is a sectional view of the servomotor unit and gearing driven thereby to control the film speed.
Figure 5:
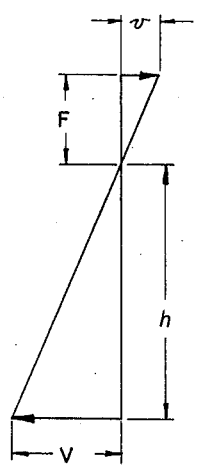
Fig. 5 is a diagram indicating the relation of elements of the formula of operation.

The servo speed adjusting motor 6 is shown in Fig. 3. It drives shaft 35 which through worm and wheel gearing controls the speed control dial 36. In order to prevent overrunning of the servomotor, a pair of limit switches indicated at 37 and 38 are arranged to stop the motor at either limit of the operating range.

Figure 4:
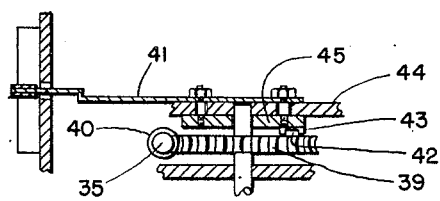
Fig. 4 is a sectional view of the same taken on the line 4—4 of Fig. 3.

The limit switch arrangement includes a worm wheel 39, Fig. 4, driven by a worm 40 on shaft 35 and an arm 41 actuated from the worm wheel. As shown, a dog 42 on the worm wheel engages a dog 43 secured to the arm 41. As shown, the arm 41 is supported in a stationary plate 44 to move in opposite directions sufficiently to operate the reversing switches 37 and 38. A disc 45 on the opposite side of the supporting plate 44 is secured to the arm 41 by suitable bolts extending through slots in the plate. Worm wheel 39 has free rotation thru nearly 360°.

It is desirable to provide means for varying the width of the slit of the camera to obtain differences in the time of exposure as light conditions and the character of the objective photographed require. It is also desirable to provide variation for altitude and ground speed, and preferably automatically, in order that the slit width may be suitably correlated with the film speed and other factors. Adjustments for light conditions and the type of objective to be photographed are made manually to avoid the complication of light measuring devices and arrangements for automatically controlling the slit therefrom. A manually adjustable five point cam 47 engaged by a follower 48 controlling the exposure slit provides for the selection of one of five exposure slit widths. A further adjustment in accordance with altitude is made automatically by rotation of the cam.

Figure 7:
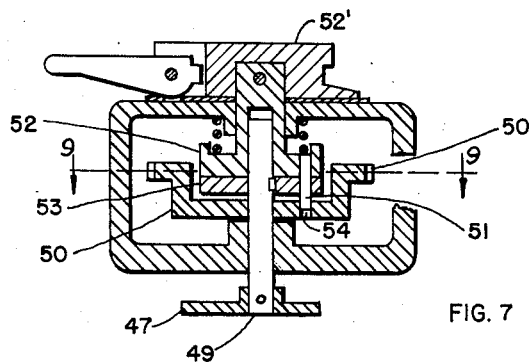
Fig. 7 is a sectional view of the slit control unit.
Figure 8:
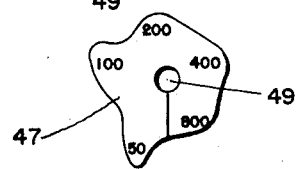
Fig. 8 is a view of the cam shown in Fig. 7.
Figure 9:
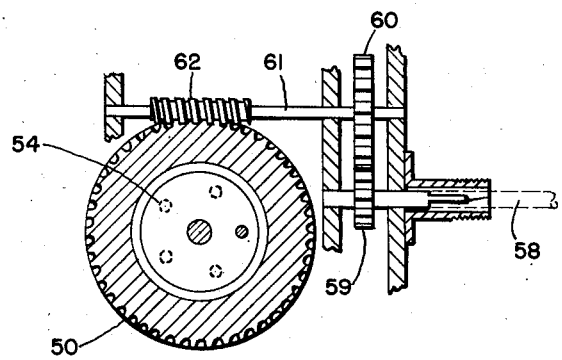
Fig. 9 is another sectional view of the slit control unit taken on the line 9—9 of Fig. 7.

As shown in Figs. 7 and 9, the cam 47 is secured to shaft 49 and held in selected position relative to a loose worm wheel 50 by pin 51 carried in sliding collar 52 and operable through collar 53 to engage any one of five locking holes 54 in the worm wheel 50. In order to set the cam, the collar 52 is lifted by hand grip 52' to retract the pin from the worm wheel 50, the shaft is turned to a new position and the pin reinserted. Automatic adjustment for altitude is obtained by rotation of cam 47 through a small angle under control of the servomotor 6.

To this end a shaft 55 is driven from servomotor shaft 35 (Fig. 3) through pinion 56 and gear 57. A flexible shaft 58 is connected to be driven by shaft 55 and to operate the camera slit control mechanism. As shown in Fig. 9, the flexible shaft 58 drives through gears 59 and 60 and shaft 61, a worm 62 engaging the worm wheel 50.

As the servomotor operates to increase or decrease the speed of drive of the film, the cam 47 will be actuated simultaneously and correspondingly to control the width of the slit.

Figure 6:
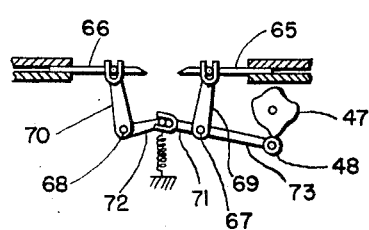
Fig. 6 is a detail view of the slit adjusting mechanism.

In Fig. 6 is shown the slit mechanism and its connections by which the follower 48 actuates a device to modify the width of the slit. The slit blades 65, 66 are moved toward and from each other to vary the size of the slit by rock shafts 67, 68 thru arms 69, 70. The rock shafts are connected to rock oppositely by arms 71, 72 and they are actuated from cam 47 and follower 48 by arm 73 on which the follower is carried.

A ballast tube 74 and resistance 75 are included in the circuit to improve the operation.

Figure 10:
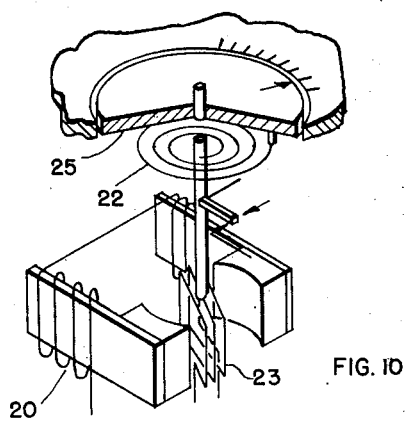
Fig. 10 is a perspective view showing certain details of the product relay.

Specifically, the operation of the mechanism is as follows:

The moving coil or armature 23 of product relay 10 is spring biased by a hairspring 22 (Figs. 1 and 10) and as shown in Fig. 10, the spring can be loosened or tightened by rotation of disc 25 to which one end is attached, the other end of the spring being fixed to the shaft of armature 23. For a given setting on disc 25, there will be a balance point or equilibrium when the torque created on the armature shaft by the reaction of field winding 20 will be equal but opposite to the spring torsion and at that point the armature will be at rest with the contact arm of double contact switch 13 out of contact with respect to the contacts, namely with both contacts open.

If the altitude is changed this will cause a change in current in the field winding 24 and the armature coil 23 will move clockwise or counter-clockwise depending upon whether the current is increased or decreased. This will result in the contact arm of switch 13 closing one side or the other of the contacts and thereby the servomotor 6 will be rotated in one or the other direction, thereby increasing or decreasing the speed of the film and of the tachometer generator. The tachometer generator thus will supply to moving coil 23 a current in proportion to the change and when this reaches the balance point the moving coil or armature 23 will again swing to the balance point due to the action of spring 22. Since spring 22 is a hairspring, it will not matter whether the movements of the armature 23 are additive or substractive to the torsional effect, since the tendency of the spring will always be to establish the equilibrium or balance point.

In like manner, changes of ground speed introduced manually by variation of resistance in the armature circuit by manipulation of variable resistor 24 will result in an out-of-balance which will swing armature 23 the one or the other way until the current in the moving coil or armature 23 has been changed to give the balance position with switch 13 in normally open position.

Thus, for a preselected torsion on spring 22, whenever the equilibrium is disturbed by change of altitude or ground speed, the device will automatically bring the system into equilibrium after changing the film speed of the camera to suit the new conditions called for.

The foregoing particular description of a selected embodiment of the invention is illustrative merely and is not intended as defining the limits of the invention.

I claim:

1. For an aerial camera of the type described having variable speed drive for the film, a film speed control means comprising in combination a radio altimeter providing a current substantially proportional to altitude; a tachometer generator driven with the film drive of the camera providing a current substantially proportional to film speed; a product relay having a fixed field winding and a moving armature coil; electrical connections between the tachometer generator and the armature coil and between the radio altimeter and the field winding; manually operable variable resistance in series with the armature coil graduated in terms of ground speed of the aircraft carrying the camera, for introducing a factor proportional to said ground speed; a hairspring acting on said moving coil against the torque of the energizing currents in said coil and winding obtained from said radio altimeter and tachometer generator to maintain the coil in a position of equilibrium for selected values of altitude and ground speed; a pair of switch contacts; a switch arm normally out of contact with said contacts when said coil is in the position of equilibrium and movable with said coil into contact with one of the other of said contacts when said coil swings one way or the other under changes of value of altitude or ground speed; a servomotor in circuit with said switches to be driven in one direction of rotation or the other depending on which switch contact is closed; and connections between said servomotor and the variable speed drive for the film whereby the film speed will be increased or decreased in accordance with changes of altitude or ground speed until the position of equilibrium is again reached.

2. For an aerial camera of the type described having a variable speed drive for the film the combination with a radio altimeter and a tachometer generator driven with said variable speed drive; of a product relay having a fixed field and a moving armature; a circuit connecting the fixed field of the relay with the radio altimeter to permit it to receive a current proportional to altitude; a circuit connecting the armature of the relay with the tachometer generator to permit it to receive a current proportional to film speed; a variable resistance in the armature circuit for permitting manual alteration of the current proportional to film speed in accordance with the ground speed of the aircraft carrying the camera; resilient means acting on said armature and adjustable to cause balancing of the torque caused by the interaction of the fixed field and moving armature at a desired film speed; a switch contact moving with said armature as it swings due to unbalancing of said torque and resilient means when altitude or ground speed are changed; a pair of switches alternatively operated by said switch contact to close one or another circuit; and a servomotor operated in one or the other direction of rotation by closing of one or the other switch circuit, said servomotor being drivingly connected with said variable film speed drive to alter the speed thereof either under automatic influence of changes of the current proportional to altitude or under manual influence of changes in the current proportional to film speed, until balancing the torque and spring are again attained, when said switch contact will be out of contact with both switches.

AUGUST RASPET.

REFERENCES CITED

The following references are of record in the file of this patent:

UNITED STATES PATENTS

| Number | Name | Date |
|---|---|---|
| 2,077,486 | Lootens | Apr. 20, 1937 |
| 2,116,586 | Stoller | May 10, 1938 |
| 2,183,399 | Heising | Dec. 12, 1939 |
| 2,338,605 | Tuttle et al. | Jan. 4, 1944 |
| 2,366,621 | Hineline | Jan. 2, 1945 |
| 2,393,015 | Bendz | Jan. 15, 1946 |
| 2,401,530 | Vought | June 4, 1946 |
| 2,413,349 | Hancock et al. | Dec. 31, 1946 |
| 2,424,989 | Koepfer | Aug. 5, 1947 |
| 2,476,677 | Merritt et al. | July 19, 1949 |